(12) United States Patent
Shah et al.

(10) Patent No.: US 11,338,810 B2
(45) Date of Patent: May 24, 2022

(54) VEHICLE YIELD DECISION

(71) Applicant: Ford Global Technologies, LLC, Dearborn, MI (US)

(72) Inventors: Romil Shah, Santa Clara, CA (US); Shounak Athavale, San Jose, CA (US); Vidhya Iyer, Sunnyvale, CA (US); Anuja Anil Shirsat, Mountain View, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 351 days.

(21) Appl. No.: 16/800,712

(22) Filed: Feb. 25, 2020

(65) Prior Publication Data

US 2021/0261128 A1 Aug. 26, 2021

(51) Int. Cl.
| | |
|---|---|
| *B60W 30/00* | (2006.01) |
| *B60W 30/18* | (2012.01) |
| *B60W 50/06* | (2006.01) |
| *G08G 1/16* | (2006.01) |
| *G06N 3/08* | (2006.01) |
| *G06N 3/04* | (2006.01) |
| *G06V 20/58* | (2022.01) |
| *G06K 9/62* | (2022.01) |
| *B60W 50/00* | (2006.01) |

(52) U.S. Cl.
CPC ...... *B60W 30/18009* (2013.01); *B60W 50/06* (2013.01); *G06N 3/0454* (2013.01); *G06N 3/08* (2013.01); *G06V 20/58* (2022.01); *G08G 1/161* (2013.01); *B60W 2050/0083* (2013.01); *B60W 2530/18* (2013.01); *B60W 2552/05* (2020.02); *B60W 2552/10* (2020.02); *B60W 2554/406* (2020.02); *G06K 9/6256* (2013.01)

(58) Field of Classification Search
CPC .......... B60W 30/18009; B60W 50/06; B60W 2554/406; B60W 2552/05; B60W 2552/10; B60W 2050/0083; B60W 2530/18; G06V 20/58; G06N 3/0454; G06N 3/08; G08G 1/161; G06K 9/6256
See application file for complete search history.

(56) References Cited

U.S. PATENT DOCUMENTS

| | | | | | |
|---|---|---|---|---|---|
| 6,813,555 | B1 * | 11/2004 | Kerner | .................... | G06T 9/004 |
| | | | | | 701/117 |
| 9,523,984 | B1 * | 12/2016 | Herbach | ............... | B60W 10/20 |

(Continued)

FOREIGN PATENT DOCUMENTS

| | | |
|---|---|---|
| GB | 2552816 A1 | 2/2018 |
| JP | 2004245610 A | 9/2004 |

(Continued)

*Primary Examiner* — Russell Frejd
*Assistant Examiner* — Brittany Renee Peko
(74) *Attorney, Agent, or Firm* — Frank A. MacKenzie; Bejin Bieneman PLC (57) ABSTRACT

Upon determining a first vehicle is moving on a two-way road in a first direction of travel in an only lane of the two-way road, vehicle sensor data is input to a first neural network that identifies a yield area along the two-way road via image segmentation. A second vehicle is detected traveling toward the first vehicle on the only lane of the two-way road. Then, upon determining the first vehicle is to yield to the second vehicle, one or more vehicle components are actuated to move the first vehicle to the yield area.

20 Claims, 4 Drawing Sheets

(56) References Cited

U.S. PATENT DOCUMENTS

| | | | |
|---|---|---|---|
| 10,953,878 B2* | 3/2021 | Zinner | B60W 30/16 |
| 2015/0224988 A1* | 8/2015 | Buerkle | B60W 30/0956 |
| | | | 701/45 |
| 2019/0084559 A1* | 3/2019 | Sim | G08G 1/056 |
| 2019/0283743 A1 | 9/2019 | Kawabe et al. | |
| 2019/0369644 A1* | 12/2019 | Goudy | G08G 1/0137 |
| 2020/0005647 A1* | 1/2020 | Tsurumi | G09B 29/10 |

FOREIGN PATENT DOCUMENTS

| | | |
|---|---|---|
| JP | 6457826 B2 | 1/2019 |
| WO | 2018163856 A1 | 9/2018 |

* cited by examiner

VEHICLE YIELD DECISION

BACKGROUND

Vehicles can be equipped with computing devices, networks, sensors and controllers to acquire data regarding the vehicle's environment and to operate the vehicle based on the data. Vehicle sensors can provide data concerning routes to be traveled and objects to be avoided in the vehicle's environment. Operation of the vehicle can rely upon acquiring accurate and timely data regarding objects in a vehicle's environment while the vehicle is being operated on a roadway.

DETAILED DESCRIPTION

A system includes a computer including a processor and a memory, the memory storing instructions executable by the processor to upon determining a first vehicle is moving on a two-way road in a first direction of travel in an only lane of the two-way road, input vehicle sensor data to a first neural network that identifies a yield area along the two-way road via image segmentation. The instructions further include instructions to detect a second vehicle traveling toward the first vehicle on the only lane of the two-way road. The instructions further include instructions to then, upon determining the first vehicle is to yield to the second vehicle, actuate one or more vehicle components to move the first vehicle to the yield area.

The instructions can further include instructions to input yield parameters to a second neural network that determines whether the first vehicle is to yield to the second vehicle. The yield parameters can include at least one of dimensions of the yield area, a distance from the first vehicle to the yield area, a terrain of the yield area, a distance traveled along the two-way road, and a number of vehicles behind the first vehicle.

The instructions can further include instructions to determine the yield parameters based on vehicle sensor data The instructions can further include instructions to determine whether the first vehicle is to yield to the second vehicle based further on a message from the second vehicle specifying whether the first vehicle is to yield to the second vehicle.

The instructions can further include instructions to, upon determining the first vehicle is traveling on the two-way road, receive the second neural network from a server.

The instructions can further include instructions to update the second neural network based on the yield parameters and to provide the updated second neural network to the server.

The instructions can further include instructions to determine the first vehicle is to yield to the second vehicle based on a lack of communication between the first vehicle and the second vehicle.

The instructions can further include instructions to, upon determining a lack of communication between the first vehicle and the second vehicle, determine the first vehicle is to yield to the second vehicle based on detecting the second vehicle approaching the first vehicle after a predetermined time.

The instructions can further include instructions to, upon determining a lack of communication between the first vehicle and the second vehicle, detect the second vehicle yielding based on vehicle sensor data indicating operation of the second vehicle.

The instructions can further include instructions to actuate one or more vehicle components to operate the first vehicle along the two-way road based on detecting the second vehicle yielding.

The instructions can further include instructions to actuate one or more vehicle components to stop the first vehicle in the yield area based on one or more dimensions of the yield area being equal to or greater than respective thresholds.

The instructions can further include instructions to actuate one or more vehicle components to operate the first vehicle through the yield area based on one or more dimensions of the yield area being less than respective thresholds.

The instructions can further include instructions to determine the first vehicle is traveling on the two-way road based on vehicle sensor data.

The instructions can further include instructions to, upon identifying the yield area, overwrite a stored yield area in the memory.

A method upon determining a first vehicle is moving on a two-way road in a first direction of travel in an only lane of the two-way road, inputting vehicle sensor data to a first neural network that identifies a yield area along the two-way road via image segmentation. The method further includes detecting a second vehicle traveling toward the first vehicle on the only lane of the two-way road. The method further includes then, upon determining the first vehicle is to yield to the second vehicle, actuating one or more vehicle components to move the first vehicle to the yield area.

The method can further include inputting yield parameters to a second neural network that determines whether the first vehicle is to yield to the second vehicle. The yield parameters can include at least one of dimensions of the yield area, a distance from the first vehicle to the yield area, a terrain of the yield area, a distance traveled along the two-way road, and a number of vehicles behind the first vehicle The method can further include determining the yield parameters based on vehicle sensor data.

The method can further include determining whether the first vehicle is to yield to the second vehicle based further on a message from the second vehicle specifying whether the first vehicle is to yield to the second vehicle.

The method can further include, upon determining the first vehicle is traveling on the two-way road, receiving the second neural network from a server.

The method can further include updating the second neural network based on the yield parameters and to provide the updated second neural network to the server.

Further disclosed herein is a computing device programmed to execute any of the above method steps. Yet further disclosed herein is a computer program product, including a computer readable medium storing instructions executable by a computer processor, to execute an of the above method steps.

Figure 1:
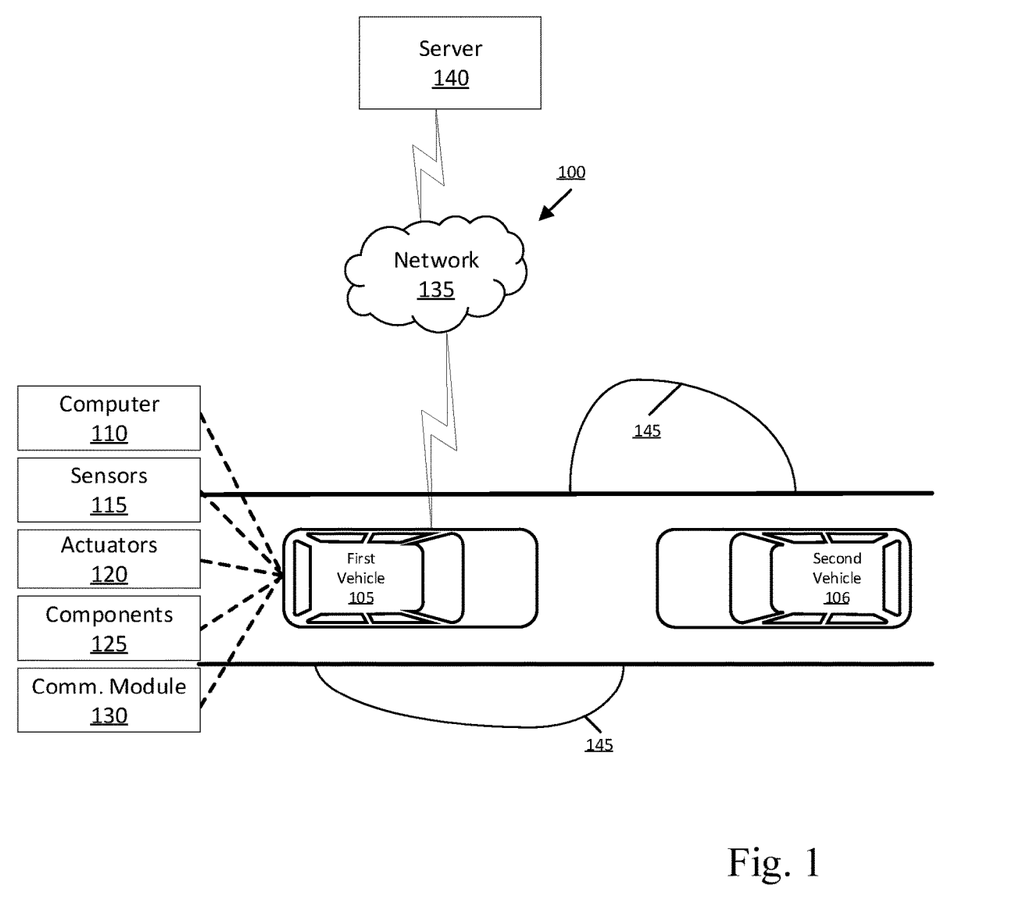
FIG. 1 is a block diagram illustrating an example vehicle control system for a vehicle.

FIG. 1 is a block diagram illustrating an example vehicle control system 100. A first vehicle 105 includes a vehicle computer 110 programmed to, upon determining that the first vehicle 105 is moving on a two-way road in a first direction of travel in an only lane of the two-way road, input vehicle 105 sensor 115 data to a first neural network that identifies a yield area 145 along the two-way road by analyzing the sensor data. The vehicle computer 110 is further programmed to detect a second vehicle 106 traveling toward the first vehicle 105 on the only lane of the two-way road. The vehicle computer 110 is further programmed to, upon determining the first vehicle 105 is to yield to the second vehicle 106, actuate one or more vehicle components 125 to move the first vehicle 105 to the yield area 145.

When moving in a first direction in an only lane of a two-way road, a first vehicle 105 may detect a second vehicle 106 moving toward the first vehicle 105, i.e., in a second direction opposing the first direction in the only lane of the two-way road. A width of the only lane of the two-way road may be, e.g., less than the combined widths of the vehicles 105, 106, such that the vehicles 105, 106 cannot operate around each other in the only lane of the two-way road. Advantageously, the vehicle computer 110 can determine one or more yield areas 145 along the two-way road and can determine whether the first vehicle 105 is to yield to the second vehicle 106 based on one or more yield parameters (as described below). The vehicle computer 110 can then operate the first vehicle 105 to a yield area 145 or around the second vehicle 106 in a yield area 145 based on whether the first vehicle 105 or the second vehicle 106 is to yield, which allows the vehicles 105, 106 to maneuver around each other in opposing directions in the only lane of the two-way road.

The first vehicle 105 includes a vehicle computer 110, sensors 115, actuators 120 to actuate various vehicle components 125, and a vehicle communications module 130. The communications module 130 allows the vehicle computer 110 to communicate with a server 140 and/or the second vehicle 106, e.g., via a messaging or broadcast protocol such as Dedicated Short Range Communications (DSRC), cellular, and/or other protocol that can support vehicle-to-vehicle, vehicle-to infrastructure, vehicle-to-cloud communications, or the like, and/or via a packet network 135.

The vehicle computer 110 includes a processor and a memory such as are known. The memory includes one or more forms of computer-readable media, and stores instructions executable by the vehicle computer 110 for performing various operations, including as disclosed herein.

The vehicle computer 110 may operate the first vehicle 105 in an autonomous, a semi-autonomous mode, or a non-autonomous (or manual) mode. For purposes of this disclosure, an autonomous mode is defined as one in which each of vehicle 105 propulsion, braking, and steering are controlled by the vehicle computer 110; in a semi-autonomous mode the vehicle computer 110 controls one or two of vehicle 105 propulsion, braking, and steering; in a non-autonomous mode a human operator controls each of vehicle 105 propulsion, braking, and steering.

The vehicle computer 110 may include programming to operate one or more of vehicle 105 brakes, propulsion (e.g., control of acceleration in the first vehicle 105 by controlling one or more of an internal combustion engine, electric motor, hybrid engine, etc.), steering, transmission, climate control, interior and/or exterior lights, etc., as well as to determine whether and when the vehicle computer 110, as opposed to a human operator, is to control such operations.

The vehicle computer 110 may include or be communicatively coupled to, e.g., via a vehicle communications network such as a communications bus as described further below, more than one processor, e.g., included in electronic controller units (ECUs) or the like included in the first vehicle 105 for monitoring and/or controlling various vehicle components 125, e.g., a transmission controller, a brake controller, a steering controller, etc. The vehicle computer 110 is generally arranged for communications on a vehicle communication network that can include a bus in the first vehicle 105 such as a controller area network (CAN) or the like, and/or other wired and/or wireless mechanisms.

Via the vehicle 105 network, the vehicle computer 110 may transmit messages to various devices in the first vehicle 105 and/or receive messages (e.g., CAN messages) from the various devices, e.g., sensors 115, an actuator 120, ECUs, etc. Alternatively, or additionally, in cases where the vehicle computer 110 actually comprises a plurality of devices, the vehicle communication network may be used for communications between devices represented as the vehicle computer 110 in this disclosure. Further, as mentioned below, various controllers and/or sensors 115 may provide data to the vehicle computer 110 via the vehicle communication network.

Vehicle 105 sensors 115 may include a variety of devices such as are known to provide data to the vehicle computer 110. For example, the sensors 115 may include Light Detection And Ranging (LIDAR) sensor(s) 115, etc., disposed on a top of the first vehicle 105, behind a vehicle 105 front windshield, around the first vehicle 105, etc., that provide relative locations, sizes, and shapes of objects surrounding the first vehicle 105. As another example, one or more radar sensors 115 fixed to vehicle 105 bumpers may provide data to provide locations of the objects, second vehicles 106, etc., relative to the location of the first vehicle 105. The sensors 115 may further alternatively or additionally, for example, include camera sensor(s) 115, e.g. front view, side view, etc., providing images from an area surrounding the first vehicle 105. In the context of this disclosure, an object is a physical, i.e., material, item that can be represented by physical phenomena (e.g., light or other electromagnetic waves, or sound, etc.) detectable by sensors 115. Thus, first and second vehicles 105, 106, as well as other items including as discussed below, fall within the definition of "object" herein.

The vehicle computer 110 is programmed to receive data from one or more sensors 115, e.g., via the vehicle network. For example, the data may include a location of the first vehicle 105. Location data may be in a known form, e.g., geo-coordinates such as latitude and longitude coordinates obtained via a navigation system, as is known, that uses the Global Positioning System (GPS). Additionally, or alternatively, the data can include a position of an object, e.g., a second vehicle 106, a pole, a curb, a bicycle, a tree, a shrub, etc., relative to the first vehicle 105. As one example, the data may be image data of the environment around the first vehicle 105. In such an example, the image data may include a single lane two-way road and one or more yield areas 145 along the single lane two-way road. The image data may include a second vehicle 106 in front of the first vehicle 105 and/or a third vehicle behind the first vehicle 105 in the only lane of the two-way road. Image data is digital image data, e.g., comprising pixels with intensity and color values, that can be acquired by camera sensors 115. The sensors 115 can be mounted to any suitable location in or on the first vehicle 105, e.g., on a vehicle 105 bumper, on a vehicle 105 roof, etc., to collect images of the environment around the first vehicle 105.

The vehicle 105 actuators 120 are implemented via circuits, chips, or other electronic and or mechanical components that can actuate various vehicle subsystems in accordance with appropriate control signals as is known. The actuators 120 may be used to control components 125, including braking, acceleration, and steering of a first vehicle 105.

In the context of the present disclosure, a vehicle component 125 is one or more hardware components adapted to perform a mechanical or electro-mechanical function or operation—such as moving the first vehicle 105, slowing or stopping the first vehicle 105, steering the first vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a suspension component 125 (e.g., that may include one or more of a damper, e.g., a shock or a strut, a bushing, a spring, a control arm, a ball joint, a linkage, etc.), a brake component, a park assist component, an adaptive cruise control component, an adaptive steering component, one or more passive restraint systems (e.g., airbags), a movable seat, etc.

In addition, the vehicle computer 110 may be configured for communicating via a vehicle-to-vehicle communication module 130 or interface with devices outside of the first vehicle 105, e.g., through a vehicle-to-vehicle (V2V) or vehicle-to-infrastructure (V2X) wireless communications (cellular and/or DSRC, etc.) to another vehicle, to a server 140 (typically via direct radio frequency communications), and/or (typically via the network 135) to a second vehicle 106. The communications module 130 could include one or more mechanisms, such as a transceiver, by which the computers 110 of vehicles 105 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module 130 include cellular, Bluetooth, IEEE 802.11, dedicated short range communications (DSRC), and/or wide area networks (WAN), including the Internet, providing data communication services.

The network 135 represents one or more mechanisms by which a vehicle computer 110 may communicate with remote computing devices, e.g., the server 140, a vehicle computer of the second vehicle 106, etc. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

The vehicle computer 110 is programmed to identify a single lane two-way road. A two-way road is a road that is provided for vehicle travel in opposing directions along the road. A lane is a specified area of the road for vehicle travel. A road should be understood to include any surface defined or provided for land vehicle travel. A lane of a road should be understood to include an area defined along a length of a road having a width to accommodate only one vehicle, i.e., multiple vehicles can travel in a lane one in front of the other, but not abreast of, i.e., laterally adjacent, one another. The vehicle computer 110 may, for example, identify the single lane two-way road based on data, e.g., map data, received from a remote computer, e.g., a server 140. Additionally, or alternatively, the vehicle computer 110 can identify the single lane two-way road based on sensor 115 data. That is, the vehicle computer 110 can be programmed to receive sensor 115 data, e.g., image data, from the sensors 115 and to implement various image processing techniques to identify the single lane two-way road. As one example, the vehicle computer 110 can detect a sign, or marker, proximate to (i.e., within sensor and/or visual range) the single lane two-way road via image data. The vehicle computer 110 can then compare the detected sign to a plurality of signs, e.g., stored in a look-up table or the like, and identify the single lane two-way road based on the detected sign matching a stored sign identifying a single lane two-way road.

As another example, the vehicle computer 110 can determine a width of a two-way road based on image data. For example, the vehicle computer 110 can identify the two-way road in the image data, e.g., using various image processing techniques and/or techniques for detecting and measuring objects represented in image data. For example, the vehicle computer 110 can determine the width of the two-way road based on determining edges of the two-way road from image data. For example, it is known to perform semantic segmentation of the image data to identify features such as road edges or boundaries, e.g., by providing images as input to a convolutional neural network (CNN) and obtaining as output a specification of a range of pixel coordinates associated with a feature such as an edge of the road. By identifying a set of pixel coordinates in an image associated with an edge of the road, and determining a distance (in pixel coordinates) from an image sensor 115 lens to the identified road-edge pixel coordinates, the computer 110 can then determine a distance of a vehicle 105 sensor 115 lens from the edge of the road. That is, according to conventional techniques, the computer 110 can determine a distance from the lens to the identified coordinates (in pixel coordinates) and can further determine, from the image, an angle between a line from the sensor 115 lens to the identified edge point and an axis extending from the lens parallel to a longitudinal axis of the vehicle 105. Then, using trigonometric functions, the computer 110 can determine a length of a line drawn perpendicularly to the vehicle 105 longitudinal axis from the sensor 115 lens to a point on the edge of the road. By repeating this process for an edge of the road on a second side of the vehicle 105, and summing the lengths of two lines perpendicular to the vehicle 105 longitudinal axis and drawn from the sensor 115 lens to respective road edge, the width of the road may be determined.

The vehicle computer 110 can then compare the width of the two-way road to a threshold width. The threshold width is a minimum width that allows at least two vehicles 105, 106 to operate beside each other on the two-way road. The threshold width may be determined based on, e.g., government regulations specifying a maximum width of a vehicle 105, 106. In the case the width of the two-way road is above the threshold, the vehicle computer 110 determines the road is a multi-lane two-way road. In the case that the width of the two-way road is below the threshold width, the vehicle computer 110 determines the road is a single lane two-way road.

The vehicle computer 110 is programmed to determine the first vehicle 105 is approaching or moving in the only, i.e., single, lane of the two-way road. For example, the vehicle computer 110 can receive a location of the first vehicle 105, e.g., from a location sensor 115, a navigation system, a remote computer, etc. Additionally, the vehicle computer 110 can determine that the first vehicle 105 is moving on or approaching the two-way road by, e.g., GPS-based geo-fencing. In such an example, the GPS-based geo-fence specifies a perimeter of the two-way road. The vehicle computer 110 can then compare location data of the first vehicle 105 to the geo-fence perimeter of the two-way road. As another example, the vehicle computer 110 can detect a beginning of the two-way road in front of the first vehicle 105 based on sensor 115 data, e.g., using conventional image processing techniques. The vehicle computer 110 can then determine a distance from the first vehicle 105 to the beginning of the two-way road The vehicle computer 110 can determine whether the first vehicle 105 is moving in the only lane of the two-way road or approaching the only lane of the two-way road based on determining the first vehicle 105 is operating, e.g., within a predetermined distance of the beginning of the two-way road or within the geo-fence perimeter.

Upon determining the first vehicle is approaching or moving in the only lane of the two-way road, the vehicle computer 110 can then receive weights for a second neural network (as discussed below) from a server 140, e.g., using federated learning techniques. The server 140 is a computing device, i.e., including one or more processors and one or more memories, programmed to provide operations such as disclosed herein. Further, the server 140 can be accessed via the network 135, e.g., the Internet or some other wide area network. Additionally, the vehicle computer 110 can receive a version identifier (as discussed below) of the second neural network from the server 140. The vehicle computer 110 can then store the weights for the second neural network, e.g., in a memory. For example, the vehicle computer 110 can overwrite or erase previous weights stored in the memory. The vehicle computer 110 can be programmed to provide updated weights for the second neural network to the server 140, e.g., via the network 135, as discussed below.

The vehicle computer 110 can identify one or more yield areas 145 along the two-way road based on sensor 115 data. A yield area 145 is a ground surface along, e.g., a side of, the two-way road that provides an area for vehicle maneuvers outside the only lane of the two-way road. The yield area 145 includes dimensions along the ground surface, e.g., a length and a width. Additionally, the yield area 145 includes a terrain, e.g., grass, mud, gravel, dirt, etc. The terrain of the yield area 145 may be the same or different from a terrain of the two-way road. The vehicle computer 110 can, for example, input sensor 115 data into the first neural network, such as a DNN (see FIG. 2), that can be trained to accept sensor 115 data from the sensors 115 as input and generate an output identifying a yield area 145. The output identifying the yield area 145 specifies a location, e.g., GPS coordinates or a linear distance from the first vehicle 105, dimensions, and the terrain of the yield area 145.

The vehicle computer 110 can then store e.g., in a memory, data specifying the yield area 145 (i.e., a set of coordinates specifying the area 145) while the first vehicle 105 is on the two-way road. The vehicle computer 110 stores, e.g., in a memory, a threshold number of yield areas 145 while the first vehicle 105 is on the two-way road. The threshold number may be one or more. The threshold number may be specified, e.g., by a manufacturer or designer. In the case that the number of stored yield areas 145 equals the threshold number, upon identifying a subsequent yield area 145, e.g., via the first neural network, the vehicle computer 110 overwrites or erases a stored yield area 145 (typically the oldest, i.e., least recent in time) in the memory. The vehicle computer 110 may be programmed to erase the yield area(s) 145 from the memory upon determining the first vehicle 105 departed the two-way road, e.g., based on sensor 115 data and/or location data.

The vehicle computer 110 determines one or more yield parameters for the first vehicle 105 based on sensor 115 data and/or output from the first neural network. A yield parameter is a measurement of a physical characteristic of the first vehicle 105 or an environment around the first vehicle 105 while the first vehicle 105 is operating in the only lane of the two-way road. The vehicle computer 110 can store the yield parameter(s), e.g., in a memory, while the first vehicle 105 is on the two-way road. The vehicle computer 110 can transmit a message to the second vehicle 106, e.g., via the network 135, specifying the yield parameter(s) for the first vehicle 105. Additionally, the vehicle computer 110 can receive a message from the second vehicle 106 specifying the yield parameter(s) for the second vehicle 106. Non-limiting examples of yield parameters can include the following:

| Parameter | Explanation | Example Values |
| --- | --- | --- |
| Vehicle Dimensions | A two-dimensional description of the respective vehicle 105, 106. As used herein, a dimension is a measurable extent along a line, e.g., a length, a width. The vehicle dimensions are stored in a memory of the vehicle computer 110. | 190 in. × 72 in, 528 cm × 198 cm, etc. |
| Yield Area Dimensions | A two-dimensional description of the yield area. The yield area dimensions include a length and a width. The yield area 145 dimensions can be output from the first neural network, as described further below. | 150 in × 50 in, 600 cm × 200 cm, etc. |
| Yield Area Distance | A linear distance from a reference point on the respective vehicle 105, 106 to the yield area 145. The yield area 145 distance can be determined based on sensor 115 data, e.g., using various image processing techniques. | 50 ft, 10 m, etc. |

-continued

| Parameter | Explanation | Example Values |
|---|---|---|
| Yield Area Position | A position of the yield area 145 relative to the reference point on the respective vehicle 105, 106. The yield area 145 direction can be determined based on sensor 115 data, e.g., using various image processing techniques. | In front of, behind, alongside, etc. |
| Travel Distance | A linear distance traveled by the respective vehicle 105, 106 in the only lane of the two-way road. The travel distance can be determined based on location data of the respective vehicle 105, 106 and/or sensor 115 data indicating an average speed of the respective vehicle 105, 106 while moving in the only lane of the two-way road and an amount of time the respective vehicle 105, 106 is moving in the only lane of the two-way road. | 100 ft, 25 m, 1 mile, etc. |
| Yield Area Terrain | A type of ground surface of the yield area 145. The yield area 145 terrain can be output from the first neural network. | Dirt, gravel, grass, concrete, etc. |
| Vehicle Count | A number of vehicles operating behind the respective vehicle 105, 106. The number of vehicles can be determined based on sensor 115 data from the respective vehicle 105, 106 and data received from the vehicles operating behind the respective vehicle 105, 106, e.g., via the network 135. | 0 vehicles, 1 vehicle, 5 vehicles, etc. |
| Vehicle Distance | A linear distance from a reference point on the first vehicle 105 to a reference point on the second vehicle 106. The vehicle distance can be determined based on sensor 115 data, e.g., using various image processing techniques, and/or location data of each vehicle 105, 106. | 100 ft, 50 m, etc. |

The vehicle computer 110 can detect a second vehicle 106 in front of the first vehicle 105 based on sensor 115 data. For example, the vehicle computer 110 can then identify, using conventional image processing and recognition techniques, a front or a rear of the second vehicle 106 based on the sensor 115 data (e.g., identifying headlamps or backup lights, respectively, of the second vehicle 106 in image data). Additionally, the vehicle computer 110 can determine whether the vehicle distance is decreasing. For example, the vehicle computer 110 can determine a difference in the vehicle distance during a time period. If the difference between the vehicle distances is less than zero, i.e., a negative number, the vehicle computer 110 determines that the vehicle distance is decreasing, e.g., the second vehicle 106 is moving in the second direction or moving in the first direction at a slower speed than the first vehicle 105. If the difference between the vehicle distances is equal to or greater than zero, the vehicle computer 110 determines the vehicle distance is not decreasing, e.g., the second vehicle 106 is moving in the first direction at a same or faster speed than the first vehicle 105.

In the case that the vehicle computer 110 identifies a rear of the second vehicle 106 and determines that the vehicle distance is decreasing, the vehicle computer 110 actuates one or more vehicle components 125 to operate the first vehicle 105 such that the vehicle distance is equal to or greater than a threshold. The threshold may be determined based on, e.g., empirical testing and/or simulation to determine a distance between vehicles 105, 106 that allows for safe operation of the vehicles 105, 106 (e.g., based on speed of the vehicles 105, 106, terrain of the two-way road, time of day, line of sight, presence of precipitation, etc.). In the case that the vehicle computer 110 identifies a front of the second vehicle 106 and determines that the vehicle distance is decreasing, the vehicle computer 110 determines whether the first vehicle 105 or the second vehicle 106 is to yield, as discussed below. In the case that the vehicle computer 110 determines the vehicle distance is not decreasing, the vehicle computer 110 actuates one or more vehicle components 125 to continue operation of the first vehicle 105 in the only lane of the two-way road.

The vehicle computer 110 may be programmed to determine a communication status of the second vehicle 106, i.e., whether the second vehicle 106 is in communication with the first vehicle 105, e.g., via the network 135. For example, upon detecting the second vehicle 106 in the only lane of the two-way road, the vehicle computer 110 can transmit a message to the second vehicle 106, e.g., via the network 135 (e.g., requesting the second vehicle 106 to provide the yield parameter(s) for the second vehicle 106). In the case that the vehicle computer 110 receives a response from the second vehicle 106 (e.g., specifying the yield parameter(s) for the second vehicle 106) within a predetermined time, the vehicle computer 110 determines the second vehicle 106 is in communication with the first vehicle 105. In the case that the vehicle computer 110 does not receive a response from the second vehicle 106 within the predetermined time, the vehicle computer 110 determines the second vehicle 106 is not in communication with the first vehicle 105. The predetermined time may be determined by, e.g., empirical testing to determine a minimum response time for vehicles to receive and respond to messages (e.g., via the network 135).

The vehicle computer 110 is programmed to make a yield decision. A yield decision is a determination that one of the first vehicle 105 or the second vehicle 106 is to yield or is yielding to the other vehicle 105, 106. Upon determining that the second vehicle 106 is not in communication with the first vehicle 105, the vehicle computer 110 may make a yield decision based on sensor 115 data. For example, the vehicle computer 110 can determine movement of the second vehicle 106 relative to the first vehicle 105 in the only lane of the two-way road based on, e.g., location data, image data, proximity sensor 115 data, etc. In the case that the vehicle distance decreases, the vehicle computer 110 can determine the first vehicle 105 is to yield. In the case the vehicle distance increases, the vehicle computer 110 can determine the second vehicle 106 is yielding. As another example, the vehicle computer 110 can detect the second vehicle 106 moving out of the only lane of the two-way road, e.g., into a yield area 145. In such example, the vehicle computer 110 can determine the second vehicle 106 is yielding. Alternatively, upon determining a lack of communication between the vehicles 105, 105, the vehicle computer 110 may make a yield decision specifying the first vehicle 105 is to yield to the second vehicle 106 by default.

Upon determining the second vehicle 106 is in communication with the first vehicle 105, the vehicle computer 110 may make a yield decision based on output from the second neural network. For example, the vehicle computer 110 can input the yield parameter(s) for the first vehicle 105 and the second vehicle 106 into the second neural network, such as a deep neural network (DNN) (see FIG. 2), that can be trained to accept yield parameters for the first vehicle 105 and the second vehicle 106 moving in the only lane of the two-way road as input and generate an output of a yield decision.

Additionally, in the case that the vehicles 105, 106 are in communication, the vehicle computer 110 can be programmed to verify the yield decision with the second vehicle 106. For example, the vehicle computer 110 can receive a message from the second vehicle 106 specifying a yield decision for the second vehicle 106. In such an example, the vehicle computer 110 compares the yield decision for the second vehicle 106 to the yield decision for the first vehicle 105. The vehicle computer 110 determines the yield decisions match in the case that each specify the same vehicle 105, 106 is to yield. In the case that the yield decisions match, the vehicle computer 110 verifies the yield decision and operates the first vehicle 105 according to the yield decision, as described below.

In the case that the yield decisions do not match, i.e., are unverified, the vehicle computer 110 makes a yield decision based on the output of an updated version of the second neural network. A version of the second neural network identifies the weights for the second neural network. Each version may include a version identifier, e.g., an alphanumeric string, identifying the respective version. For example, the second vehicle 106 may transmit a version identifier of the second neural network stored, e.g., in a memory, by the second vehicle 106, e.g., in a same or different message as the yield decision for the second vehicle 106. The vehicle computer 110 can then compare the version identifier of the second neural network received from the second vehicle 106 to the version identifier of the second neural network received from the server 140. The vehicle computer 110 identifies the updated version of the second neural network based on the respective version identifiers (e.g., a character in one version identifier having a larger numerical value than the corresponding character in the other version identifier).

Additionally, the vehicle computer 110 can update the weights for the second neural network. For example, the vehicle computer 110 trains the second neural network, e.g., by updating weights and biases via suitable techniques such as back-propagation with optimizations, based on the yield parameters for the first vehicle 105 and the second vehicle 106 and the verified yield decision. The vehicle computer 110 then provides the server 140 the updated weights for second neural network, e.g., via the network 135. The server 140 can then update the version of the second neural network, e.g., stored in a memory of the server 140, i.e., overwrite the previous version, and generate an updated version identifier.

The vehicle computer 110 may be programmed to provide the yield decision to a user of the first vehicle 105. For example, the vehicle computer 110 can actuate one or more vehicle components 125, e.g., a display screen, a speaker, etc., to output the yield decision to the user. Additionally, the vehicle computer 110 can provide the yield parameter(s) for the first vehicle 105 and/or the second vehicle 106 to the user via one or more vehicle components 125.

In the case that the yield decision specifies the first vehicle 105 is to yield to the second vehicle 106, the vehicle computer 110 actuates one or more vehicle components 125 to move the first vehicle 105 to the yield area 145, e.g., according to conventional techniques for autonomous or semi-autonomous operation. The vehicle computer 110 then compares the yield area 145 dimensions to threshold dimensions. The threshold dimensions may specify a minimum dimension, e.g., length and width, above which the first vehicle 105 can stop in the yield area 145. The threshold dimensions may be equal to or greater than the dimensions of the first vehicle 105.

For example, in the case that the yield area 145 dimensions are equal to or greater than dimensions of the first vehicle 105, the vehicle computer 110 can actuate one or more vehicle components 125 to stop the first vehicle 105 in the yield area 145. In such an example, the vehicle computer 110 can actuate one or more vehicle components to move the first vehicle 105 from the yield area 145 to the only lane of the two-way road upon detecting the second vehicle 106 passed the yield area 145. That is, the vehicle computer 110 can maintain the first vehicle 105 in the yield area 145 until a path of the first vehicle 105 in the first direction in the only lane of the two-way road is unobstructed. In the case that at least one yield area 145 dimension is less than the respective dimension of the first vehicle 105, the vehicle computer 110 operates the first vehicle 105 through the yield area 145. That is, the vehicle computer 110 actuates one or more vehicle components 125 to continue movement of the first vehicle 105 around the second vehicle 106 via the yield area 145, while the second vehicle 106 operates in the direction opposite the first direction in the only lane of the two-way road. Said differently, the first vehicle 105 and the second vehicle 106 simultaneously pass each other.

In the case that the yield decision specifies the second vehicle 106 is to yield to the first vehicle 105, the vehicle computer 110 actuates one or more vehicle components 125 to move the first vehicle 105 in the first direction in the only lane of the two-way road. For example, the vehicle computer 110 can operate the first vehicle 105 in the first direction such that the vehicle distance is equal to or greater than the threshold. Upon detecting a width, e.g., based on image data, between the second vehicle 106 and a side of the only lane of the two-way road being greater than a width of the first vehicle 105 (e.g., when the second vehicle 106 is in a yield area 145), the vehicle computer 110 can operate the first vehicle 105 in the first direction in the only lane of the two-way road around the second vehicle 106.

Figure 2:
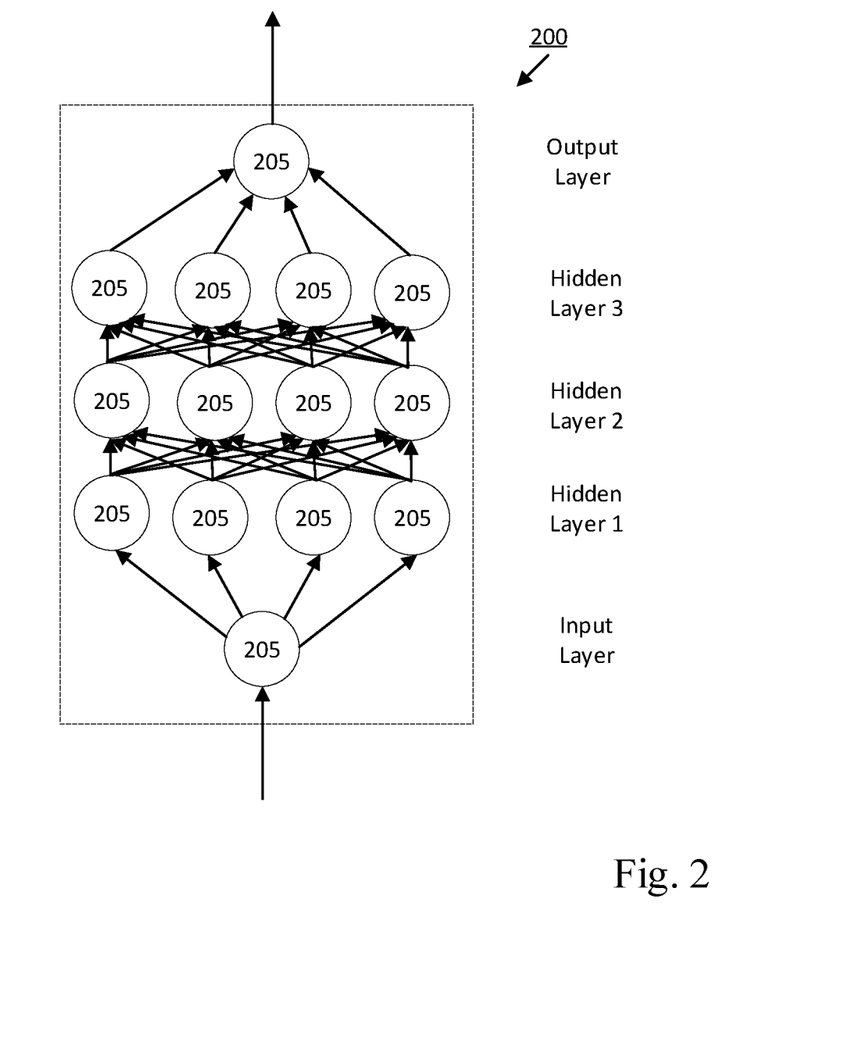
FIG. 2 is an example diagram of a deep neural network.

FIG. 2 is a diagram of an example deep neural network (DNN) 200. The DNN 200 can be a software program that can be loaded in memory and executed by a processor included in a computer, for example. In an example implementation, the DNN 200 can include, but is not limited to, a convolutional neural network (CNN), R-CNN (Region-based CNN), Fast R-CNN, and Faster R-CNN. The DNN includes multiple nodes, and the nodes are arranged so that the DNN 200 includes an input layer, one or more hidden layers, and an output layer. Each layer of the DNN 200 can include a plurality of nodes 205. While FIG. 2 illustrate three (3) hidden layers, it is understood that the DNN 200 can include additional or fewer hidden layers. The input and output layers may also include more than one (1) node 205.

The nodes 205 are sometimes referred to as artificial neurons 205, because they are designed to emulate biological, e.g., human, neurons. A set of inputs (represented by the arrows) to each neuron 205 are each multiplied by respective weights. The weighted inputs can then be summed in an input function to provide, possibly adjusted by a bias, a net input. The net input can then be provided to an activation function, which in turn provides a connected neuron 205 an output. The activation function can be a variety of suitable functions, typically selected based on empirical analysis. As illustrated by the arrows in FIG. 2, neuron 205 outputs can then be provided for inclusion in a set of inputs to one or more neurons 205 in a next layer.

As one example, the DNN 200 can be trained with ground truth data, i.e., data about a real-world condition or state. For example, the DNN 200 can be trained with ground truth data and/or updated with additional data by a processor of the vehicle computer 110. Weights can be initialized by using a Gaussian distribution, for example, and a bias for each node 205 can be set to zero. Training the DNN 200 can include updating weights and biases via suitable techniques such as back-propagation with optimizations. Ground truth data can include, but is not limited to, data specifying objects, e.g., vehicles 105, 106, yield areas 145, foliage, etc., within an image or data specifying a physical parameter. For example, the ground truth data may be data representing objects and object labels. In another example, the ground truth data may be data representing an object, e.g., a first vehicle 105, and a relative angle and/or speed of the object, e.g., the first vehicle 105, with respect to another object, e.g., a second vehicle 106, etc.

During operation, the vehicle computer 110 obtains sensor 115 data, e.g., image data of the two-way road, and provides the sensor 115 data to the first neural network. The first neural network can be programmed to identify one or more yield areas 145 along the two-way road based on a process called image segmentation. That is, the first neural network can be programmed to segment and categorize objects, e.g., vehicles, roads, foliage, terrain, buildings, etc., based on connected regions of pixels in color image data.

Image segmentation is a machine vision process wherein an input color image is segmented into connected regions. A DNN 200 can be trained to segment an input color image into connected regions by inputting a plurality of color images along with ground truth data. For example, in an image of a traffic scene, ground truth data can include information on objects included in the color image, such as area and distance and direction from the sensor 115 to a vehicle in the field of view. Ground truth data can be acquired independently from the color image, for example by direct observation or measurement, or by processing that is independent from the DNN 200 processing. Ground truth data can be used to provide feedback to the DNN 200 during training, to reward correct results and punish bad results. By performing a plurality of trials with a plurality of different DNN 200 parameters and assessing the results with ground truth data, a DNN 200 can be trained to output correct results upon inputting color image data. The connected regions can be subject to minimum and maximum areas, for example. The connected regions can be categorized by labeling each connected region with one of a number of different categories corresponding to objects. The categories can be selected by the DNN 200 based on the size, shape, and location of the objects in color image. For example, a DNN 200 can include different categories, e.g., for different makes and models of vehicles, different types of terrain (e.g., grass, mud, gravel, etc.), different types of foliage (e.g., trees, bushes, shrubs, etc.), etc.

During operation, the vehicle computer 110 determines the yield parameter(s) of the first vehicle 105 and obtains the yield parameter(s) of the second vehicle 106. The vehicle computer 110 then provides the yield parameter(s) of the first and second vehicles 105, 106 to the second neural network. The second neural network generates a prediction based on the received input. The output is a yield decision specifying whether the first vehicle 105 or the second vehicle 106 is to yield to the other vehicle 105, 106.

Figure 3A:
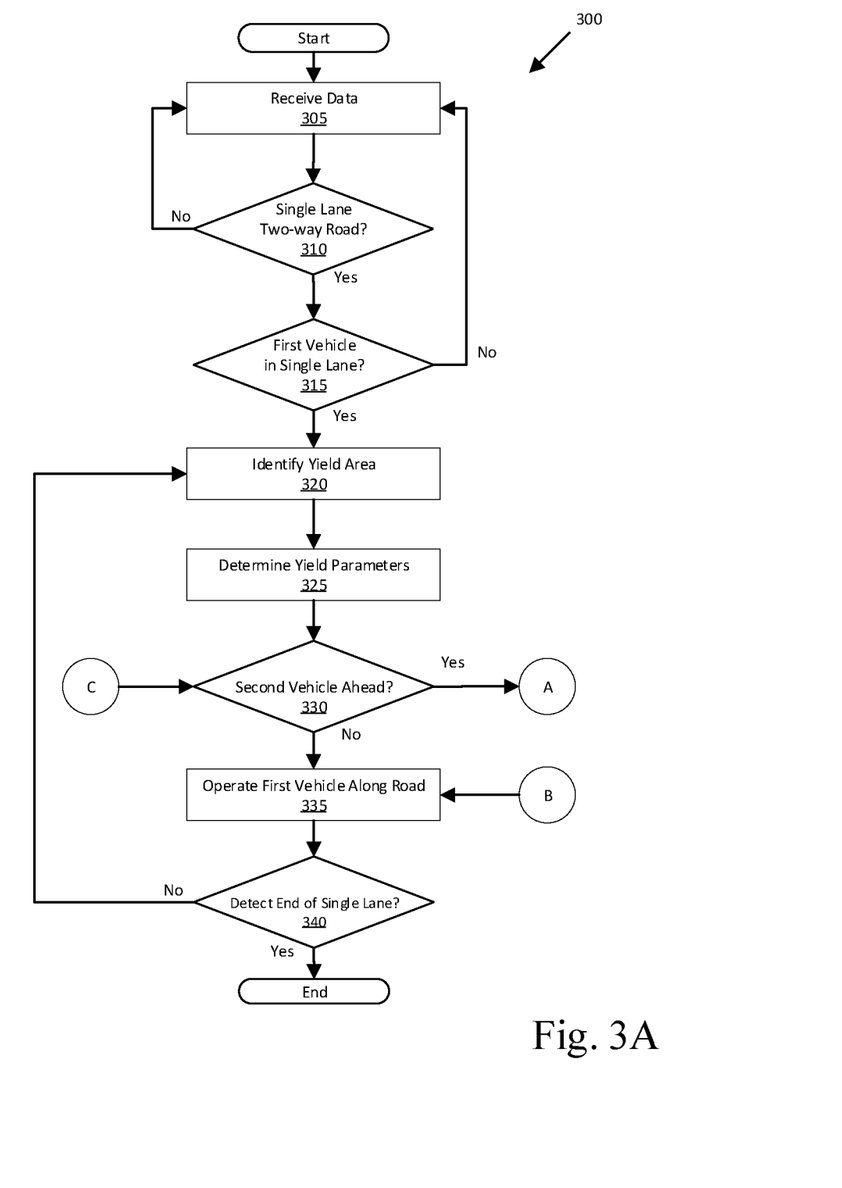
FIG. 3A is a first part of a flowchart of an exemplary process for determining a vehicle is to yield.

FIG. 3A is a first portion of a flowchart of an example process 300 (the second portion being shown in FIG. 3B because the entire flowchart will not fit on a single drawing sheet) for determining whether a first vehicle 105 is to yield to a second vehicle 106 in an only lane of a two-way road. The process 300 begins in a block 305.

In the block 305, the vehicle computer 110 of the first vehicle 105 receives data. For example, the vehicle computer 110 can receive location data of the first vehicle 105 from, e.g., a location sensor 115, a navigation system, a remote computer, etc. Additionally, or alternatively, the vehicle computer 110 can receive a GPS-based geo-fence specifying a perimeter of a single lane two-way road. Additionally, or alternatively, the vehicle computer 110 can receive image data from one or more sensors 115, e.g., via the vehicle network. The image data may include the environment around the first vehicle 105, such as the single lane two-way road, one or more yield areas 145 along the two-way road, a second vehicle 106 in front of the first vehicle 105 in the only lane of the two-way road, and/or a third vehicle behind the first vehicle 105 in the only lane of the two-way road. The process 300 continues in a block 310.

In the block 310, the vehicle computer 110 determines whether a two-way road has a single lane (i.e., one and only one lane to serve vehicles traveling in opposing directions). For example, the vehicle computer 110 could identify a single-lane two-way road based on sensor 115 data. As one example, the vehicle computer 110 can detect a sign, or marker, proximate the two-way road, e.g., via image data. The vehicle computer 110 can then compare the detected sign to one or more images, e.g., stored in a memory, and determine the two-way road has a single-lane based on the detected sign matching a stored image, e.g., of a sign indicating a single-lane two-way road.

As another example, the vehicle computer 110 could determine a width of a two-way road based on image data. For example, the vehicle computer 110 can determine the width of the two-way road based on a number of pixels that the two-way road occupies in the image frame, as discussed above. The vehicle computer 110 can then compare the width of the two-way road to a threshold width. In the case the width of the two-way road is above the threshold, the vehicle computer 110 determines the road is a multi-lane two-way road. In the case that the width of the two-way road is below the threshold width, the vehicle computer 110 determines the road is a single lane two-way road. Alternatively, the vehicle computer 110 can determine the two-way road has a single lane based on the GPS-based geo-fence around the two-way road. For example, the vehicle computer 110 can compare a width of the geo-fence to the width threshold. In the case that the vehicle computer 110 determines the two-way road is a single lane two-way road, the process 300 continues in a block 315. Otherwise, the process 300 returns to the block 305.

In the block 315, the vehicle computer 110 determines whether the first vehicle 105 is approaching or moving in the only lane of the two-way road. For example, the vehicle computer 110 can compare the location data of the first vehicle 105 to the GPS-based geo-fence specifying the perimeter of the single-lane two way road. In such an example, the vehicle computer 110 can determine the first vehicle 105 is moving on the only lane of the two-way road based on location data of the first vehicle 105 indicating the first vehicle 105 is within the geo-fence. Alternatively, the vehicle computer 110 can determine the first vehicle 105 is within the predetermined distance of the only lane of the two-way road based on determining a distance between the location of the first vehicle 105 and the perimeter of the geo-fence.

As another example, the vehicle computer 110 could receive and analyze sensor 115 data, e.g., image data, to determine whether the first vehicle 105 is approaching or moving in the only lane of the two-way road. For example, the vehicle computer 110 can, e.g., via various lane detection techniques, determine the first vehicle 105 is moving in the only lane of the two-way road. As another example, the vehicle computer 110 could detect a beginning of the two-way road in front of the first vehicle 105, e.g., via image data. The vehicle computer 110 can then determine a distance from the first vehicle 105 to the beginning of the two-way road, e.g., using various image processing techniques, and compare that distance to the predetermined distance. The vehicle computer 110 can then determine the first vehicle 105 is approaching based on the distance being equal to or less than the predetermined distance. In the case that the first vehicle is approaching or moving in the only lane of the two-way road, the process 300 continues in a block 320. Otherwise, the process 300 returns to the block 305.

In the block 320, the vehicle computer 110 identifies a yield area 145 along the two-way road. For example, the vehicle computer 110 can include a first neural network, such as discussed above, that can be trained to accept sensor 115 data as input and generate an output that identifies the yield area 145. The first neural network may identify the yield area 145 based on image segmentation, as discussed above. Additionally, the first neural network may identify one or more of the dimensions of the yield area 145, the terrain of the yield area 145, and the location of the yield area 145, as discussed above. Upon identifying the yield area 145, the vehicle computer 110 can store the yield area 145, e.g., in the memory.

Additionally, the vehicle computer 110 can determine the number of yield areas 145 stored in the memory. In the case that the number of yield areas 145 equals a threshold number, the vehicle computer 110 overwrites a previously stored yield area 145 with the yield area 145 output by the first neural network. The process 300 continues in a block 325.

In the block 325, the vehicle computer 110 determines the yield parameters for the first vehicle 105. For example, the vehicle computer 110 can determine the yield parameters based on sensor 115 data and/or the output from the first neural network. The yield parameters may include any one or more of the parameters identified in Table 1 above, for example. The process 300 continues in a block 330.

In the block 330, the vehicle computer 110 determines whether a second vehicle 106 is in front of the first vehicle 105 in the single, i.e., only, lane of the two-way road. For example, the vehicle computer 110 can receive sensor 115 data, e.g., image data, while moving in the only lane of the two-way road. The vehicle computer 110 can identify a second vehicle 106 in front of the first vehicle 105 using various image processing techniques. In the case that the vehicle computer 110 determines a second vehicle 106 is in front of the first vehicle 105 in the only lane of the two-way road, the process 300 continues in a block 345. Otherwise, the process 300 continues in a block 335.

In the block 335, the vehicle computer 110 operates the first vehicle 105 in the first direction in the only lane of the two-way road. For example, the vehicle computer 110 may actuate one or more vehicle components 125 to operate the first vehicle 105 in the only lane of the two-way road. The process 300 continues in a block 340.

In the block 340, the vehicle computer 110 determines whether the first vehicle 105 has reached an end of the single lane. For example, the vehicle computer 110 can determine the end of the single lane based on sensor 115 data, e.g., image data. In such an example, the vehicle computer 110 can determine the width of the two-way road, e.g., based on a number of pixels depicting the two-way road (as discussed above), and compare the width of the two-way road to the width threshold. In the case that the width is above the width threshold, the vehicle computer 110 can determine the first vehicle 105 has reached a road location at which the road includes at least one second lane in addition to the lane in which the first vehicle 105 is presently travelling. In the case that the width is below the width threshold, the vehicle computer 110 can determine that the first vehicle 105 continues to travel in a lane that is the single lane of the road. Additionally, or alternatively, the vehicle computer 110 can identify a sign, or marker, along the two-way road indicating an end of the single lane. Additionally, or alternatively, the vehicle computer 110 can determine the first vehicle 105 reached the end of the single lane based on comparing location data of the first vehicle 105 to the GPS-based geo-fence of the two-way road. In the case that the vehicle computer 110 determines the first vehicle 105 has reached the end of the single lane, the process 300 ends. Otherwise, the process returns to the block 320.

Figure 3B:
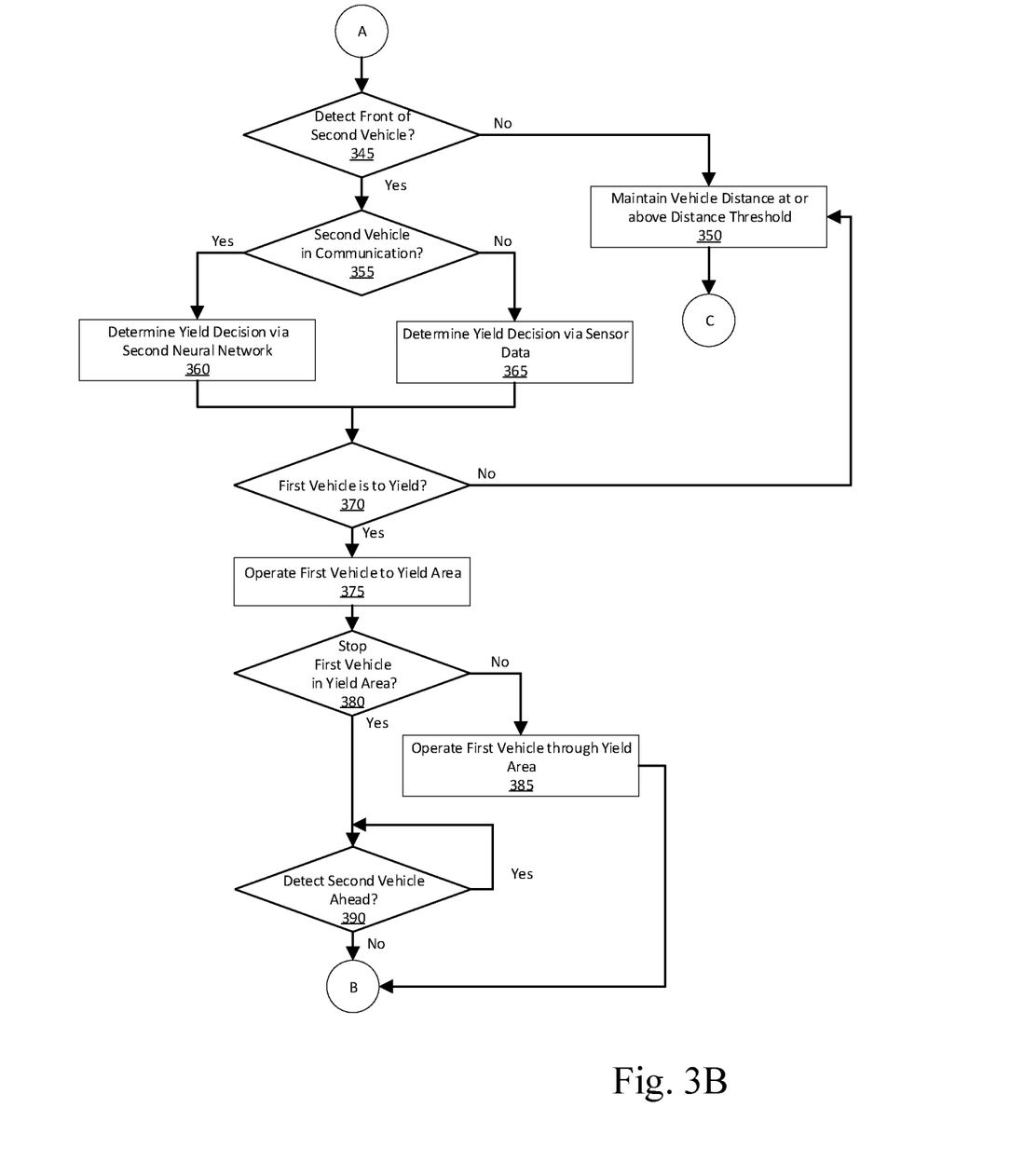
FIG. 3B is a second part of the flowchart of FIG. 3A.

Turning now to FIG. 3B, following the block 330 shown in FIG. 3A, in the block 345, the vehicle computer 110 identifies a front or a rear of the second vehicle 106. For example, the vehicle computer 110 can receive sensor 115 data, e.g., image data, indicating the second vehicle 106. The vehicle computer 110 can then identify the front or the rear of the second vehicle 106, e.g., using various image processing techniques. As one example, the vehicle computer 110 can identify the front of the second vehicle 106 based on detecting headlamps in the image data. As another example, the vehicle computer 110 can identify the rear of the second vehicle 106 based on detecting taillamps in the image data.

In the case that the vehicle computer 110 identifies the front of the second vehicle 106, the process 300 continues in a block 355. Otherwise, the process 300 continues in a block 350.

In the block 350, the vehicle computer 110 operates the first vehicle 105 in the only lane of the two-way road based on a speed and distance of the second vehicle 106. That is, the vehicle computer 110 actuates one or more vehicle components 125 to operate the first vehicle 105 and to maintain the vehicle distance (see Table 1) equal to or greater than the distance threshold. In these circumstances, the vehicle computer 110 may operate the first vehicle in the first direction when the second vehicle 106 is moving in the first direction, or in the second direction when the second vehicle 106 is moving in the second direction. The process 300 continues in the block 330.

In the block 355, the vehicle computer 110 determines whether the second vehicle 106 is in communication with the first vehicle 105. For example, the vehicle computer 110 may transmit a message to the second vehicle 106 (e.g., requesting the yield parameter(s) for the second vehicle 106). In the case that the vehicle computer 110 receives a response from the second vehicle 106 within the predetermined time (e.g., specifying the yield parameter(s) for the second vehicle 106), the vehicle computer 110 determines the second vehicle 106 is in communication with the first vehicle 105. In case that the vehicle computer 110 does not receive a response within the predetermined time, the vehicle computer 110 determines the second vehicle 106 is not in communication with the first vehicle 105. In the case that the second vehicle 106 is in communication with the first vehicle 105, the process 300 continues in a block 360. Otherwise, the process 300 continues in a block 365.

In the block 360, the vehicle computer 110 determines a yield decision. For example, the vehicle computer 110 can include a second neural network, such as discussed above, that can be trained to accept yield parameters from the first vehicle 105 and the second vehicle 106 as input and generate a yield decision, as discussed above. The vehicle computer 110 can, for example, receive the weights for the second neural network from a server 140 based on a request from the vehicle computer 110 (e.g., transmit upon the vehicle computer 110 determining the first vehicle 105 is approaching or moving in the only lane of the two-way road). Additionally, the server 140 can provide a version identifier for the second neural network, e.g., in a same or different transmission. The vehicle computer 110 can then input the yield parameter(s) for the first vehicle 105 and the yield parameter(s) for the second vehicle 106 to the second neural network. The second neural network then outputs a yield decision specifying whether the first vehicle 105 or the second vehicle 106 is to yield to the other vehicle 105, 106, as discussed above.

Additionally, the vehicle computer 110 may be programmed to verify the yield decision with the second vehicle 106. For example, the vehicle computer 110 can receive a yield decision from the second vehicle 106, e.g., via the network 135, and can compare the yield decisions. In the case that the yield decisions match, i.e., specify the same vehicle 105, 106 is to yield, then the vehicle computer 110 verifies the yield decision. In the case that the yield decisions do not match, the vehicle computer 110 makes a yield decision based on the output from the latest version of the second neural network, as discussed above. The process 300 continues in a block 370.

In the block 365, the vehicle computer 110 determines a yield decision via sensor 115 data. For example, the vehicle computer 110 can detect the second vehicle 106 is moving towards the first vehicle 105 after a duration of time. In such an example, the vehicle computer 110 can determine the first vehicle 105 is to yield to the second vehicle 106. As another example, the vehicle computer 110 can detect the second vehicle 106 is moving away from the first vehicle 105 and/or out of the only lane of the two-way road. In such an example, the vehicle computer 110 can determine the second vehicle 106 is yielding. Alternatively, the vehicle computer 110 can determine the first vehicle 105 is to yield to the second vehicle 106 upon determining a lack of communication between the vehicles 105, 106. The process 300 continues in the block 370.

In the block 370, the vehicle computer 110 determines whether the first vehicle 105 is to yield based on the yield decision determined in one of block 360 or 365. In the case that the first vehicle 105 is to yield, the process 300 continues in a block 375. Otherwise, the process 300 continues in the block 350.

In the block 375, the vehicle computer 110 is programmed to operate the first vehicle 105 to the yield area 145. For example, the vehicle computer 110 actuates one or more vehicle components 125 to move the first vehicle 105 in the only lane of the two-way road to the nearest yield area 145, e.g., stored in the memory. The process 300 continues in a block 380.

In the block 380, the vehicle computer 110 determines whether the first vehicle 105 is to stop in the yield area 145. For example, the vehicle computer 110 can compare dimensions of the yield area 145 to dimensions of the first vehicle 105. In the case that the dimensions, typically length and width, of the yield area 145 are equal to or greater the dimensions, typically length and width, of the first vehicle 105, the vehicle computer 110 can determine that the first vehicle 105 is to stop in the yield area 145. In the case that at least one of the dimensions, i.e., length and width, of the yield area 145 is less than the corresponding dimension, i.e., length and width, of the first vehicle 105, the vehicle computer 110 determines the first vehicle 105 is to operate through the yield area 145. In the case that the first vehicle is to stop in the yield area 145, the vehicle computer 110 actuates one or more vehicle components 125 to stop the first vehicle 105 in the yield area 145, and the process 300 continues in a block 390. Otherwise, the process 300 continues in a block 385.

In the block 385, the vehicle computer 110 operates the first vehicle 105 through the yield area 145. That is, the vehicle computer 110 actuates one or more vehicle components 125 to move the first vehicle 105 through the yield area 145. In such an example, the first vehicle 105 operates around the second vehicle 106 via the yield area 145 while the second vehicle 106 moves in the only lane of the two-way road. The process 300 continues in the block 335.

In the block 390, the vehicle computer 110 determines whether the second vehicle 106 is in front of, i.e., blocking, the first vehicle 105 in the only lane of the two-way road while the first vehicle 105 is stopped in the yield area 145. For example, the vehicle computer 110 can receive sensor 115 data, e.g., image data, indicating the second vehicle 106 in the only lane of the two-way road. In the case that the second vehicle 106 is not blocking the first vehicle 105 from leaving the yield area 145 (e.g., to operate in the first direction in the only lane of the two-way road), the process 300 continues in the block 335. Otherwise, the process 300 remains in the block 390.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. The adjectives "first," "second," and "third" are used throughout this document as identifiers and are not intended to signify importance or order. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising a computer including a processor and a memory, the memory storing instructions executable by the processor to:
   upon determining a first vehicle is moving on a two-way road in a first direction of travel in an only lane of the two-way road, input vehicle sensor data to a first neural network that identifies a yield area along the two-way road via image segmentation;
   detect a second vehicle traveling toward the first vehicle on the only lane of the two-way road; and
   then, upon determining the first vehicle is to yield to the second vehicle, actuate one or more vehicle components to move the first vehicle to the yield area.

2. The system of claim 1, wherein the instructions further include instructions to input yield parameters to a second neural network that determines whether the first vehicle is to yield to the second vehicle, the yield parameters including at least one of dimensions of the yield area, a distance from the first vehicle to the yield area, a terrain of the yield area, a distance traveled along the two-way road, and a number of vehicles behind the first vehicle.

3. The system of claim 2, wherein the instructions further include instructions to determine the yield parameters based on vehicle sensor data.

4. The system of claim 2, wherein the instructions further include instructions to determine whether the first vehicle is to yield to the second vehicle based further on a message from the second vehicle specifying whether the first vehicle is to yield to the second vehicle.

5. The system of claim 2, wherein the instructions further include instructions to, upon determining the first vehicle is traveling on the two-way road, receive weights for the second neural network from a server.

6. The system of claim 5, wherein the instructions further include instructions to update the weights for the second neural network based on the yield parameters and to provide the updated weights for the second neural network to the server.

7. The system of claim 1, wherein the instructions further include instructions to determine the first vehicle is to yield to the second vehicle based on a lack of communication between the first vehicle and the second vehicle.

8. The system of claim 1, wherein the instructions further include instructions to, upon determining a lack of communication between the first vehicle and the second vehicle, determine the first vehicle is to yield to the second vehicle based on detecting the second vehicle approaching the first vehicle after a predetermined time.

9. The system of claim 1, wherein the instructions further include instructions to, upon determining a lack of communication between the first vehicle and the second vehicle, detect the second vehicle yielding based on vehicle sensor data indicating operation of the second vehicle.

10. The system of claim 9, wherein the instructions further include instructions to actuate one or more vehicle components to operate the first vehicle along the two-way road based on detecting the second vehicle yielding.

11. The system of claim 1, wherein the instructions further include instructions to actuate one or more vehicle components to stop the first vehicle in the yield area based on one or more dimensions of the yield area being equal to or greater than respective thresholds.

12. The system of claim 1, wherein the instructions further include instructions to actuate one or more vehicle components to operate the first vehicle through the yield area based on one or more dimensions of the yield area being less than respective thresholds.

13. The system of claim 1, wherein the instructions further include instructions to determine the first vehicle is moving on the two-way road based on vehicle sensor data.

14. The system of claim 1, wherein the instructions further include instructions to, upon identifying the yield area, overwrite a stored yield area in the memory.

15. A method comprising:
   upon determining a first vehicle is moving on a two-way road in a first direction of travel in an only lane of the two-way road, inputting vehicle sensor data to a first neural network that identifies a yield area along the two-way road via image segmentation;
   detecting a second vehicle traveling toward the first vehicle on the only lane of the two-way road; and
   then, upon determining the first vehicle is to yield to the second vehicle, actuating one or more vehicle components to move the first vehicle to the yield area.

16. The method of claim 15, further comprising inputting yield parameters to a second neural network that determines whether the first vehicle is to yield to the second vehicle, the yield parameters including at least one of dimensions of the yield area, a distance from the first vehicle to the yield area, a terrain of the yield area, a distance traveled along the two-way road, and a number of vehicles behind the first vehicle.

17. The method of claim 16, further comprising determining the yield parameters based on vehicle sensor data.

18. The method of claim 16, further comprising determining whether the first vehicle is to yield to the second vehicle based further on a message from the second vehicle specifying whether the first vehicle is to yield to the second vehicle.

19. The method of claim 16, further comprising, upon determining the first vehicle is traveling on the two-way road, receiving weights for the second neural network from a server.

20. The method of claim 19, further comprising updating the weights for the second neural network based on the yield parameters and providing the updated weights for the second neural network to the server.

* * * * *